(12) United States Patent
Saitoh et al.

(10) Patent No.: US 7,605,860 B2
(45) Date of Patent: Oct. 20, 2009

(54) IMAGE PICKUP OPTICAL SYSTEM (75) Inventors: Kenji Saitoh, Atsugi (JP); Hiroshi Yoshikawa, Kawasaki (JP); Kenichi Saito, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 329 days.

(21) Appl. No.: 11/738,773

(22) Filed: Apr. 23, 2007

(65) Prior Publication Data
US 2007/0273782 A1 Nov. 29, 2007

(30) Foreign Application Priority Data
May 26, 2006 (JP) ............................. 2006-146437

(51) Int. Cl.
*H04N 5/232* (2006.01)
(52) U.S. Cl. ...................................... 348/345
(58) Field of Classification Search ................. 348/345; 353/69
See application file for complete search history.

(56) References Cited
U.S. PATENT DOCUMENTS

| 5,422,691 A | * | 6/1995 | Ninomiya et al. | 353/69 |
| 5,442,413 A | * | 8/1995 | Tejima et al. | 353/69 |
| 6,359,676 B1 | * | 3/2002 | Treiber et al. | 355/46 |
| 6,567,126 B1 | * | 5/2003 | Slatter et al. | 348/345 |
| 2005/0053113 A1 | * | 3/2005 | Clary et al. | 372/108 |

FOREIGN PATENT DOCUMENTS

| JP | 02-079037 | 3/1990 |
| JP | 06-265814 | 9/1994 |
| JP | 11-190864 | 7/1999 |

* cited by examiner

*Primary Examiner*—James M Hannett
(74) *Attorney, Agent, or Firm*—Cowan, Liebowitz & Latman, P.C.

(57) ABSTRACT

Provided is an image pickup optical system capable of performing focusing in a wide region without a large increase in tilt angle in the case where an image of an object is picked up from a low angle. The image pickup optical system includes a first optical system and a second optical system, for enlarging an image formed by the first optical system and forming the enlarged image. A principal plane of the first optical system is tilted relative to an image plane of the second optical system.

6 Claims, 7 Drawing Sheets

IMAGE PICKUP OPTICAL SYSTEM

BACKGROUND OF THE INVENTION

1. Field of the Invention

The present invention relates to an image pickup optical system suitable to pick up an image of an object (observation object) from a low angle.

2. Description of the Related Art

When an image of an object is picked up from a low angle close to an angle corresponding to a surface thereof, that is, from an oblique direction, an image of an uneven surface of the object can be picked up at high precision.

This is because, when the object is viewed from the oblique direction, the object is observed while the influences of substances composing the object and a size of unevenness are increased due to a polarization state or the like.

A tilt image pickup optical system has been known as an image pickup system suitable to perform image pickup while an entire image pickup surface tilted in an optical axis direction of an image pickup system is brought into focus. This image pickup principle was found by Scheimpflug. The optical system is also called a Scheimpflug optical system.

Up to now, an image pickup apparatus using a technique of the Scheimpflug optical system has been proposed (Japanese Patent Application Laid-Open No. H11-190864).

A projection apparatus using a projection optical system for projecting an image in an oblique direction, which is represented by a rear projector, has been known as an optical device to which the Scheimpflug optical system is applied. In particular, a projection apparatus for performing projection in an oblique direction at a maximum angle has been known in order to thin the projection apparatus (Japanese Patent Application Laid-Open No. H06-265814 (corresponding to U.S. Pat. No. 5,442,413) and Japanese Patent Application Laid-Open No. H02-079037).

Hereinafter, the Scheimpflug optical system will be briefly described.

Figure 11:
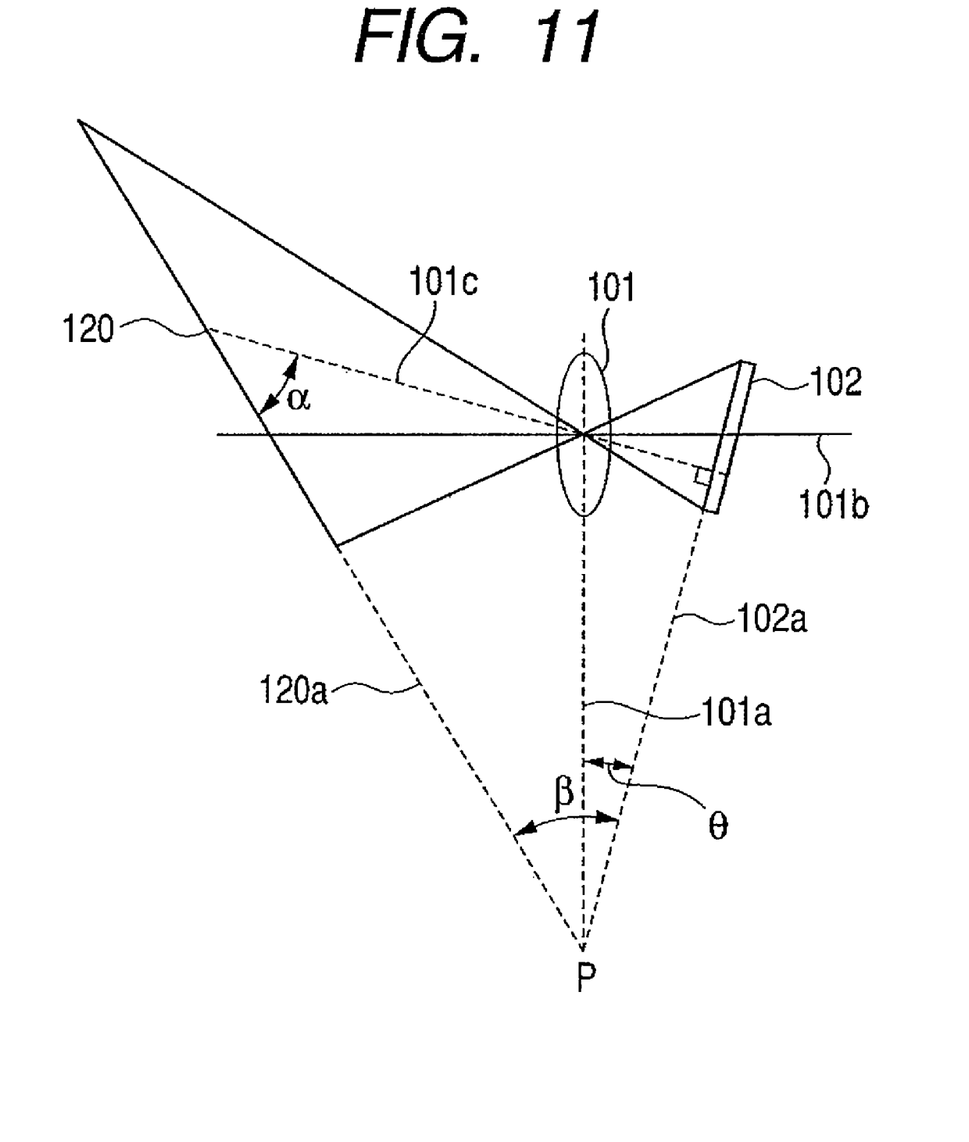
FIG. 11 is a concept view illustrating a conventional optical system satisfying the Scheimpflug condition.

FIG. 11 is a schematic explanatory diagram of an optical system for illustrating the Scheimpflug principle which is a tilt image pickup principle. In FIG. 11, an image pickup system 101, an image plane 102 of the image pickup system 101, and an object 120 which is a surface having a size are illustrated.

In general, when a principal plane 101a of the image pickup system 101 is parallel to the image plane 102 in which an image pickup element is located and the object 120 is tilted relative to an optical axis 101b, the entire region of the object 120 cannot be in focus at a time.

In order to make the entire region of the object 120 in focus, a structure is preferably employed in which an intersection P of an extended plane 102a extending from the image plane 102 in which the image pickup element is located and an extended plane 120a extending from the object 120 intersects with the principal plane 101a of the image pickup system 101. This is the Scheimpflug principle.

FIG. 11 illustrates a positional relationship among the object 120, the principal plane 101a of the image pickup system 101, and the image plane 102 in a case where Scheimpflug principle is actually applied to the image pickup system 101.

Assume that a plane including an axis 101c which is perpendicular to the image plane 102 and passes through a principal point of the image pickup system 101 and the optical axis 101b is a reference plane.

An angle $\alpha$ formed between the surface of the object 120 and the axis 101c in the reference plane is a shooting angle.

Note that "a low angle" corresponds to a small shooting angle $\alpha$, for example, an angle equal to or smaller than 20°.

An angle $\theta$ formed between the image plane 102 (final image plane in a case where an optical system for reimaging is used) and the principal plane 101a of the image pickup system 101 is a tilt angle.

An angle $\beta$ formed between the surface of the object 120 and the image plane 102 is a Scheimpflug angle.

A shooting angle in a case where the object is shot from an oblique direction using an optical system satisfying the Scheimpflug condition is normally in a range up to approximately 20°. Many optical systems satisfying the Scheimpflug condition are not expected to perform image pickup from a shooting angle equal to or smaller than 20°.

In order to enable image pickup from the low angle corresponding to the shooting angle $\alpha$ equal to or smaller than 20°, the tilt angle is preferably increased with a reduction in shooting angle.

However, when the tilt angle $\theta$ is to be increased, a shooting lens diameter lengthens and the influence of aberration increases, so that design and manufacture are difficult. Therefore, an actual maximum tilt angle has been up to approximately 10°.

A rear projection optical system using the Scheimpflug optical system is originally used for oblique projection, not for image pickup on a subject tilted relative to the optical axis, so an angle formed between a final projection plane and an optical path of a projection light beam is large. Therefore, when an image pickup optical system in which a central light beam is incident on the image plane nearly perpendicularly (described later) is used, it is difficult to obtain an image in focus in a wide area of the subject.

SUMMARY OF THE INVENTION

An object of the present invention is to provide an image pickup optical system capable of performing focusing in a wide region without a large increase in tilt angle in a case where an image of an object is picked up from a low angle.

An image pickup optical system includes a first optical system configured as a coaxial system; and a second optical system configured as a coaxial system, for enlarging an image formed by the first optical system and forming the enlarged image, in which a principal plane of the first optical system is tilted relative to an image plane of the second optical system.

Further features of the present invention will become apparent from the following description of exemplary embodiments with reference to the attached drawings.

DESCRIPTION OF THE EMBODIMENTS

Hereinafter, an image pickup optical system according to each embodiment of the present invention and an image pickup apparatus including the image pickup optical system will be described.

Image pickup optical systems according to Embodiments 1 and 2 of the present invention will be described with reference to FIGS. 1 and 2.

Figure 1:
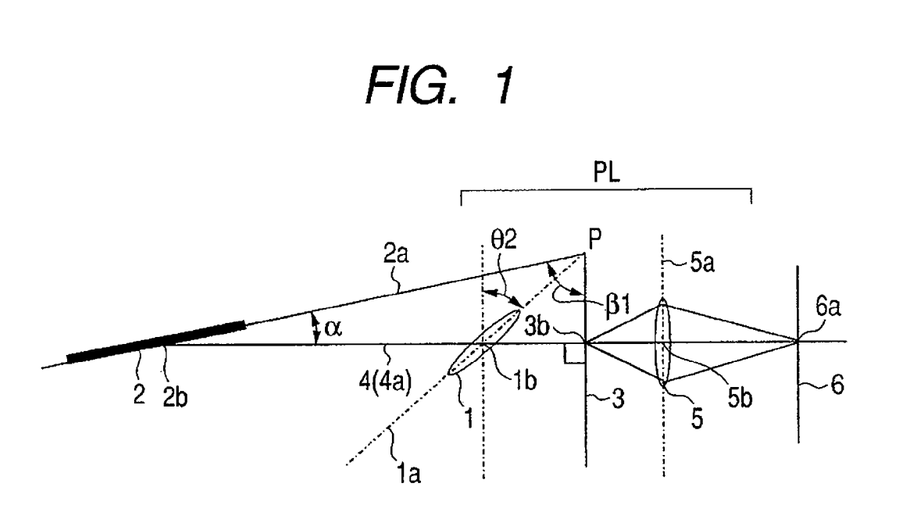
FIG. 1 is a principal part of a schematic view illustrating Embodiment 1 of the present invention.

In an image pickup optical system PL illustrated in FIG. 1, an intermediate image of an object 2 is formed on an imaging plane (intermediate image plane) 3 by a first optical system 1 configured as a coaxial system at a reduction magnification. The intermediate image formed on the imaging plane 3 is enlargedly formed (formed again) on an image pickup plane (final image plane) 6 by a second optical system 5 configured as a coaxial system. A solid-state image pickup element such as a CCD is located to the image pickup plane 6. The solid-state image pickup element receives the image formed by the second optical system 5 and converts the received image into an electrical signal.

The coaxial system is a system in which optical axes of respective constituent lenses are aligned with one another.

Embodiment 1 (FIG. 1) illustrates a case where an image of a predetermined area of an object plane (surface) 2a of the object 2 to be image-picked up is picked up at a shooting angle α by the image pickup optical system PL.

As described above, the shooting angle α is an angle formed between the image pickup object plane 2a and an axis 4 perpendicular to the final image plane 6.

In Embodiment 1, the shooting angle α is a low angle equal to or smaller than 20°.

In Embodiment 1, a principal plane 1a of the first optical system 1 of the image pickup optical system PL is tilted relative to the final image plane 6. That is, the principal plane 1a of the first optical system 1 is tilted relative to the final image plane 6 such that the final image plane 6 of the second optical system 5 and the object plane 3 become parallel to each other.

Reference symbol θ2 denotes a tilt angle formed between the final image plane 6 and the principal plane 1a of the first optical system 1.

In Embodiment 1, the image pickup object plane 2a of the object 2, the principal plane 1a of the first optical system 1, and the intermediate image plane 3 are set such that the planes intersect with each other at a single axis P to satisfy the Scheimpflug condition with a Scheimpflug angle β1. A principal plane 5a of the second optical system 5, the intermediate image plane 3, and the image pickup plane 6 are parallel to one another.

An axis passing through a principal point of the first optical system 1 which is located on one of an object side and an image side and a principal point of the second optical system 5 which is located on one of the object side and the image side is referred to as a central axis.

The central axis corresponds to the axis 4. Hereinafter, the axis 4 is also referred to as the central axis. A light beam passing through the central axis is referred to as a central light beam 4a.

In Embodiment 1 (FIG. 1), the central axis 4 and the central light beam 4a are perpendicular or substantially perpendicular to the final image plane 6 (90°±10°).

In Embodiment 1, a structure is employed in which a center 2b of the object 2, a center 3b of the intermediate image plane 3, and a center 6a of the image pickup plane 6 are aligned with one another.

Next, Embodiment 2 of the present invention will be described with reference to a principal part of a schematic view of FIG. 2. The image pickup optical system PL according to Embodiment 2 includes the first optical system 1 whose principal plane 1a is tilted relative to the image pickup plane 6 and the second optical system 5 for reforming (enlargedly forming), on the image pickup plane 6, an intermediate image of the object 2 which is formed on the imaging plane 3 by the first optical system 1.

Reference symbol α denotes the shooting angle, θ3 denotes tilt angle of the first optical system 1, and θ4 denotes a tilt angle of the second optical system 5.

The first optical system 1 is constructed such that the object plane 2a, the principal plane 1a of the first optical system 1, and an intermediate image plane 3a satisfy the Scheimpflug condition with a Scheimpflug angle β3.

The second optical system 5 is arranged such that the intermediate image plane 3a on which the first optical system 1 forms the intermediate image, the principal plane 5a of the second optical system 5, and the image pickup plane 6 satisfy the Scheimpflug condition.

Reference symbol β2 denotes a Scheimpflug angle at this time. The first optical system 1 is a reduction optical system whose imaging magnification is in reduction. The second optical system 5 is an enlarging optical system whose imaging magnification is in enlargement.

The principal plane 1a of the first optical system 1 and the principal plane 5a of the second optical system 5 are tilted in different directions relative to the image plane 6 (final image plane) of the second optical system 5.

In Embodiment 2, a structure is employed in which the axis P at which the principal plane 1a of the first optical system 1 and the imaging plane (intermediate image plane) 3 of the first optical system 1 intersect with each other and an axis Q at which the principal plane 5a of the second optical system 5 and the image plane 6 of the second optical system 5 intersect with each other are located on different sides with respect to the central axis 4.

The central light beam 4a is incident on the final image plane 6 perpendicularly or substantially perpendicularly (at 90°±10°).

Each of Embodiments 1 and 2 (FIGS. 1 and 2) illustrates a case where imaging is performed at the same imaging magnification. In Embodiment 2 (FIG. 2), a reduced intermediate image of the object 2 is formed on the imaging plane 3 by the first optical system 1 in the Scheimpflug condition.

After that, in Embodiment 2 (FIG. 2), an enlarged image of the intermediate image is formed on the image plane 6 by the second optical system 5 in the Scheimpflug condition. When "(reduction magnification)×(enlargement magnification)" is set to 1 (this value may be a magnification other than the equal size magnification), the imaging magnification in Embodiment 2 becomes equal to the imaging magnification of the image pickup optical system PL illustrated in FIG. 1.

As described above, the image pickup optical system PL according to the present invention includes the two imaging optical systems, that is, the first optical system 1 and the second optical system 5 for enlarging the image formed by the first optical system 1 and forming the enlarged image.

In contrast to this, an image pickup system using a single imaging optical system will be described in comparison with the present invention.

Figure 3:
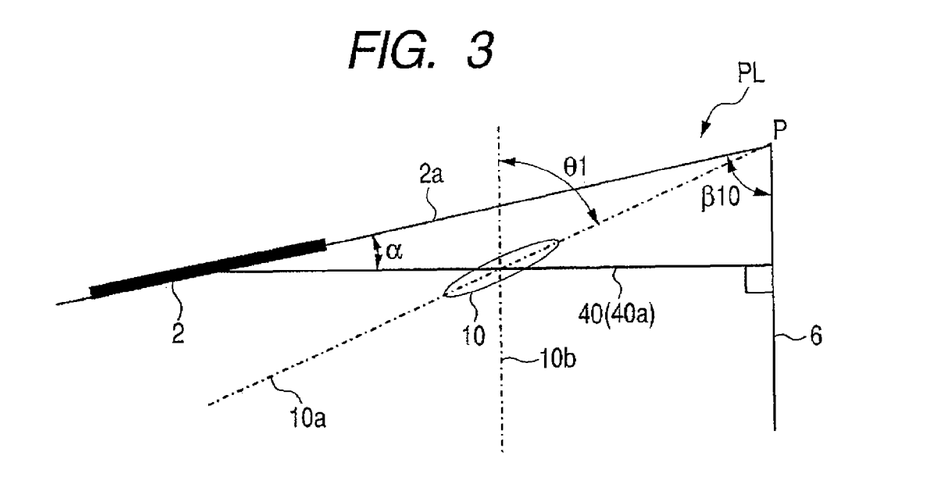
FIG. 3 is an explanatory view illustrating an optical system satisfying the Scheimpflug condition.

FIG. 3 is an explanatory view illustrating an image pickup system using a single imaging optical system whose principal plane is tilted relative to the final image plane 6.

The image pickup optical system PL illustrated in FIG. 3 is constructed such that the plane 2a to be image-picked up, a principal plane 10a of an optical system 10, and the final image plane 6 which is the image pickup plane intersect with one another at the single axis P to satisfy the Scheimpflug condition.

An axis 40 connecting the center of the object 2 with a principal point of the optical system 10 which is located on one of the object side and the image side is perpendicular to the image pickup plane 6.

In the image pickup optical system PL, FIG. 3 illustrates a state in which the image of the object 2 is formed on the image pickup plane 6 at the shooting angle α, a tilt angle θ1, and a Scheimpflug angle β10.

As illustrated in FIG. 3, when image pickup is to be performed while a light beam 40a traveling on the axis 40 is incident on the image pickup plane 6 substantially perpendicularly (at 90°±10°) by only the single optical system 10, it is necessary to increase the tilt angle θ1 which is an angle formed between the principal plane 10a of the optical system 10 and the image pickup plane 6.

In contrast to this, according to each of the cases described in Embodiments 1 and 2 (FIGS. 1 and 2), even when the central light beam 4a is incident on the image pickup plane 6 perpendicularly or substantially perpendicularly (at 90°±10°), each of the tilt angles θ2 and θ3 can be set to a value smaller than the tilt angle θ1 used in the structure including the single optical system illustrated in FIG. 3. This is because the image formed by the first optical system is enlargedly formed by the second optical system. This reason will be described in detail later.

Therefore, even when the shooting angle α is small, it is unnecessary to increase the tilt angle, with the result that excellent optical performance can be relatively easily realized.

In FIG. 1, the intermediate image plane 3 is parallel to the final image plane 6. In contrast to this, the intermediate image plane 3a is tilted relative to the final image plane 6 in FIG. 2.

Therefore, according to Embodiment 2 (FIG. 2), the tilt angle θ3 is set to a value smaller than the tilt angle θ2 as illustrated in FIG. 1.

In general, shooting from a low angle by making the shooting angle α small can be enabled by increasing the tilt angle θ in accordance with the increase in shooting angle. However, when the tilt angle θ is to be increased, a shooting lens diameter lengthens and the influence of aberration increases, so that design and manufacture are difficult. Therefore, an actual maximum tilt angle θ has been approximately 10°.

Thus, the maximum shooting angle α for image pickup has been approximately 20°.

In contrast to this, according to the respective embodiments, when the structure is employed as described above, the image of the object can be picked up based on high optical performance from the low angle corresponding to the shooting angle α equal to or smaller than 20° without a large increase in tilt angle θ.

Next, a comparison between the image pickup optical system PL according to each of Embodiments 1 and 2 and the image pickup optical system PL illustrated in FIG. 3 will be described with reference to numerical expressions.

Figure 4:
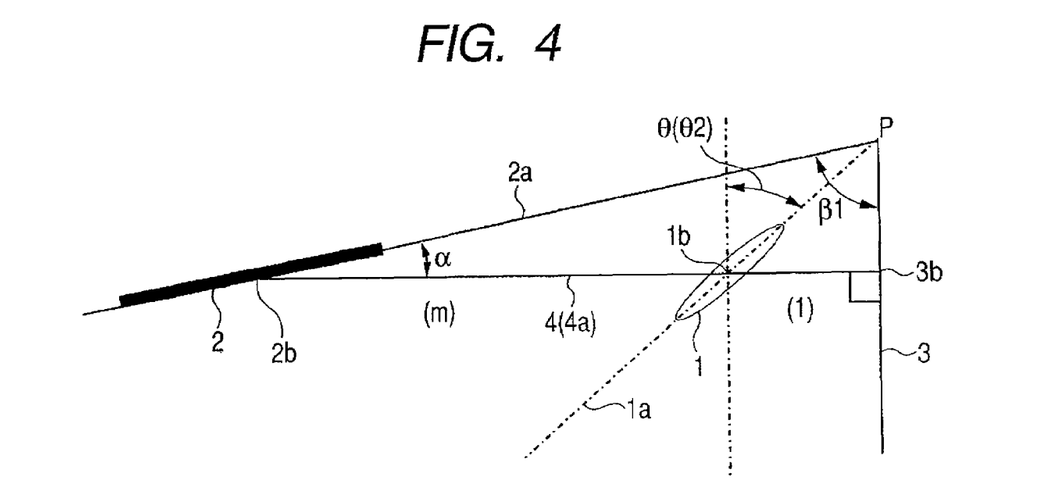
FIG. 4 is an explanatory view illustrating a part of an optical system illustrated in FIG. 1.

FIG. 4 is an explanatory view illustrating the case where the first optical system 1 illustrated in FIG. 1 and the vicinities thereof are extracted.

In FIG. 4, assuming that an image side distance (distance between a rear principal point of the first optical system 1 and the imaging plane 3) is 1, an object distance (distance between the center 2b of the object 2 and a front principal point of the first optical system 1) is expressed by "m".

In the case of an imaging magnification relationship of m:1, the tilt angle θ is expressed by the following expression.

Note that, in FIG. 4, the shooting angle α is illustrated as an angle formed between the image plane 2a to be image-picked up and a normal 4 to the imaging plane 3.

$$\theta = 90° - \tan^{-1}\{(m+1)\tan\alpha\}$$

When the imaging magnification of the first optical system 1 is an equal size magnification, m=1. Therefore, a tilt angle θβ1 is expressed by the following expression.

$$\theta\beta1 = 90° - \tan^{-1}\{2\tan\alpha\}$$

When the imaging magnification is ½, m=2. Therefore, a tilt angle θβ1/2 is expressed by the following expression.

$$\theta\beta\frac{1}{2} = 90° - \tan^{-1}\{3\tan\alpha\} < \theta\beta1 = 90° - \tan^{-1}\{2\tan\alpha\}$$

The tilt angle θβ1/2 can be set to a value smaller than the tilt angle θβ1.

Similarly, in a case of an imaging system having an arbitrary imaging magnification, for example, a total imaging magnification of p:1, that is, in a case where a reduction optical system whose magnification is 1/P is to be realized using a single Scheimpflug optical system, the tilt angle θ1 is expressed by the following expression.

$$\theta1 = 90° - \tan^{-1}\{(p+1)\tan\alpha\}$$

When this is multiplied by a reduction ratio of q:1 to obtain an optical system including a first optical system of pq:1 and a second optical system of p:q, the tilt angle θ2 is expressed by the following expression.

$$\theta2 = 90° - \tan^{-1}\{(pq+1)\tan\alpha\}$$

When q>1, that is, when the second optical system is an enlarging system, a relationship

θ2<θ1 is obtained. Therefore, it is apparent that the tilt angle can be made small.

For example, assume that an object to be examined in which a length of an object surface thereof is 300 mm is picked up at the shooting angle α of 10°.

When only the first optical system is used and the magnification of the image pickup system is set to 10/1, the tilt angle thereof becomes approximately 27.3°. When the second optical system which is an enlarging system whose magnification is 5 is used for image pickup in addition to the first optical system, the tilt angle of the first optical system becomes approximately 6.3°.

Figure 2:
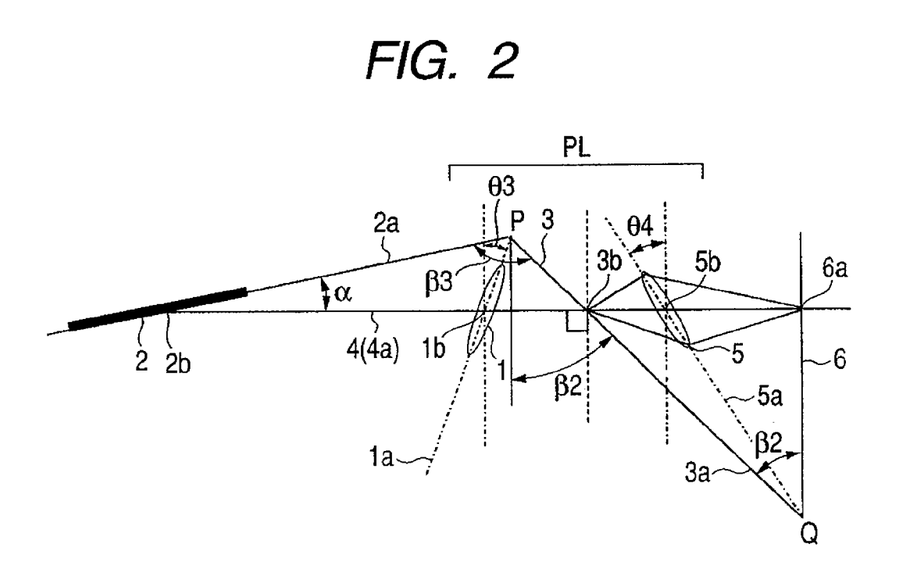
FIG. 2 is a principal part of a schematic view illustrating Embodiment 2 of the present invention.

According to the above-mentioned structure, as illustrated in FIGS. 1 and 2, the center 2b of the object plane of the object 2, a center (principal point) 1b of the principal plane 1a of the first optical system 1, the center 3b of the intermediate image plane 3, a center (principal point) 5b of the principal plane 5a of the second optical system 5, and the center 6a of the image pickup plane 6 can be set to be aligned with one another.

Next, the imaging plane 3 formed by tilting the principal plane 1a of the first optical system 1 relative to the image pickup plane 6 will be described with reference to FIGS. 1 and 2.

The case where the imaging magnification of the first optical system 1 is set to ½ and the imaging magnification of the second optical system 5 is set to 2 and thus a total imaging magnification becomes an equal size magnification will be described for simple description.

In FIG. 2, assume that an axis at which the intermediate image plane 3a and the image pickup plane 6 intersect with each other is expressed by Q. A Scheimpflug angle formed between the intermediate image plane 3a and the image pickup plane 6 is expressed by $\beta 2$.

A relationship between FIGS. 1 and 2 in the case where an angle formed between the object plane 2a and the imaging plane 3 (Scheimpflug angle) is expressed by $\beta 1$ as illustrated in FIG. 1 will be described. When an angle for tilting the imaging plane 3 set to a value equal to the Scheimpflug angle $\beta 2$ as illustrated in FIG. 2, in a case of a condition of $\beta 2 < \beta 1$, the tilt angle $\theta 4$ of the second optical system 5 can be adjusted to a value smaller than the tilt angle $\theta 2$ of the first optical system 1 which is set before the tilt of the first imaging plane 3.

At this time, the tilt angle $\theta 3$ of the first optical system 1 becomes smaller than the tilt angle $\theta 2$, with the result that the tilt angle $\theta 3$ of the first optical system 1 and the tilt angle $\theta 4$ of the second optical system 5 can be adjusted to a value smaller than the tilt angle $\theta 2$ set before the tilt of imaging plane 3 illustrated in FIG. 1.

Figure 5:
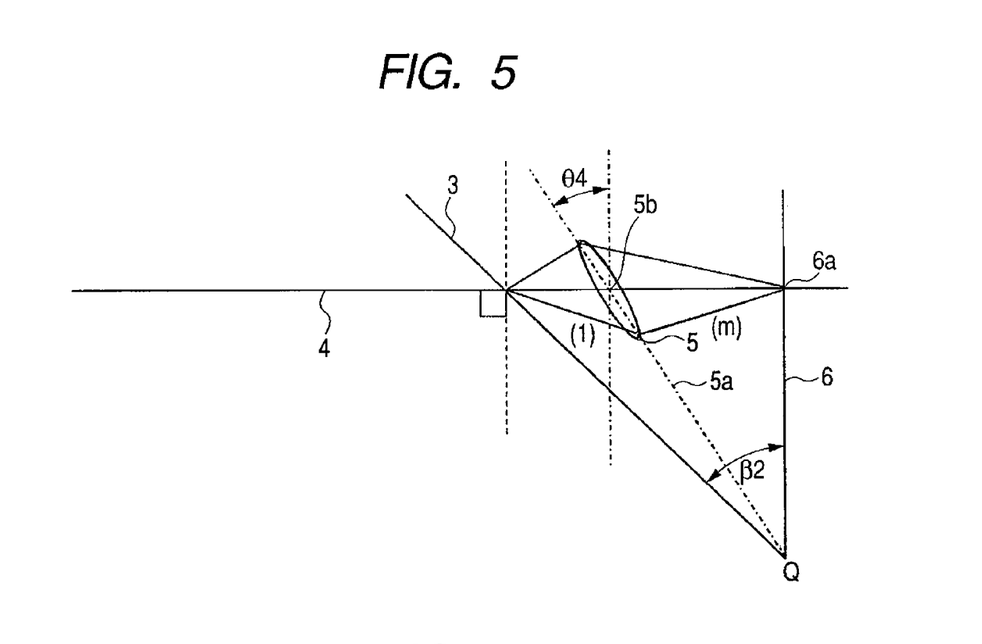
FIG. 5 is an explanatory view illustrating a part of an optical system illustrated in FIG. 2.

FIGS. 4 and 5 illustrate necessary parts extracted from FIGS. 1 and 2 in order to describe a comparison between the tilt angle $\theta 2$ and the tilt angle $\theta 4$.

Figure 6:
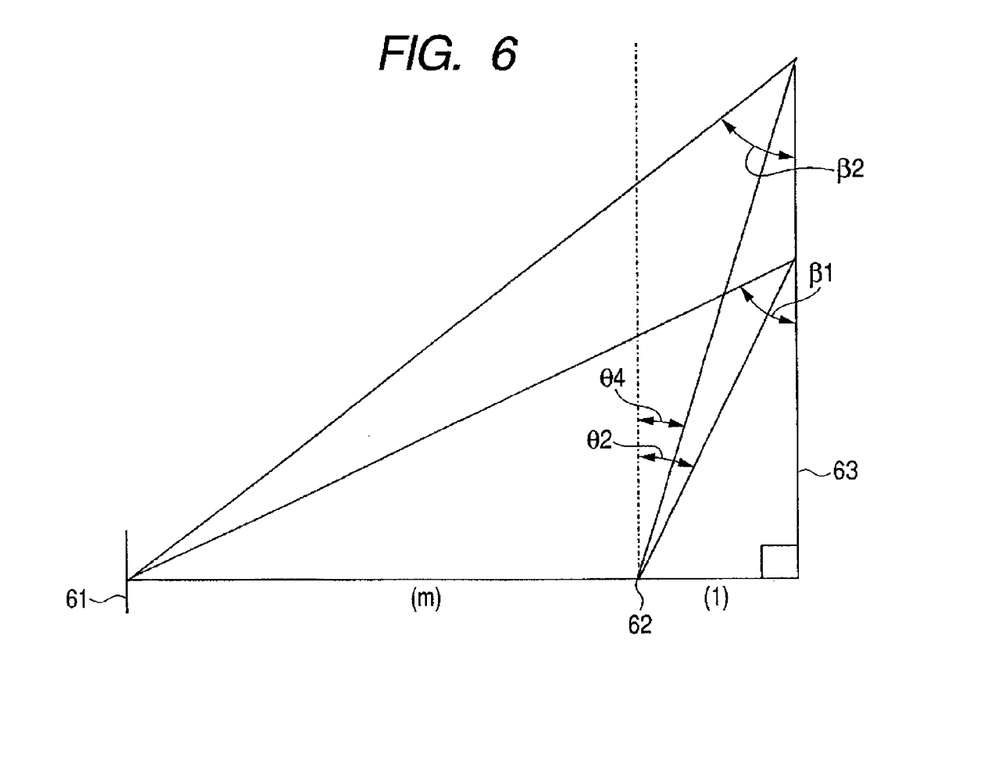
FIG. 6 is an explanatory view illustrating a relationship between a tilt angle and a Scheimpflug angle.

FIG. 6 is an arrangement view illustrating the case where each of an object plane 61, a principal plane of an optical system 62 satisfying the Scheimpflug condition, and an image plane 63 is divided by a ratio of m:1.

That is, FIG. 6 illustrates a relationship between the tilt angle $\theta$ and the Scheimpflug angle $\beta$ in the case of one of a ratio of m:1 and a ratio of 1:m.

As illustrated in FIG. 6, the tilt angle $\theta$ increases as the Scheimpflug angle $\beta$ becomes larger.

Hereinafter, the relationship between the tilt angle $\theta$ and the Scheimpflug angle $\beta$ is expressed by the following expression with respect to "m".

$$\tan \theta = 1/\{(m+1)\tan(90° - \beta)\}$$

That is, the tilt angle $\theta$ reduces as the Scheimpflug angle $\beta$ becomes smaller (assume that a ratio of an object plane distance and an image plane distance is m:1).

In the case of the condition of $\beta 2 < \beta 1$ described earlier, it is apparent that the tilt angle $\theta 4$ of the second optical system 5 can be adjusted to a value smaller than the tilt angle $\theta 2$ of the first optical system 1 (tilt angle of the system illustrated in FIG. 1) which is set before the tilt of the first imaging plane 3.

According to the structure of the entire optical system as described above, the center 2b of the object plane 2a of the object 2, the center 1b of the principal plane 1a of the first optical system 1, the center 3b of the intermediate image plane 3, the center 5b of the principal plane 5a of the second optical system 5, and the center 6a of the image pickup plane 6 can be set to be aligned with one another on a straight line.

Figure 7:
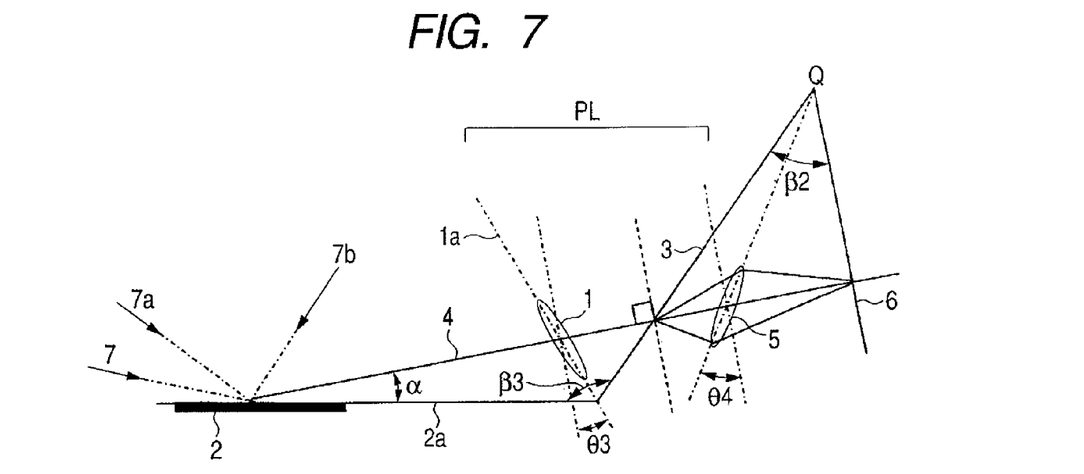
FIG. 7 is an explanatory view related to illumination in the case where an image of an object is picked up using an image pickup optical system according to the present invention.

FIG. 7 is an explanatory view illustrating an illumination method of illuminating the object 2 in the case where an image of the object is picked up by the image pickup optical system PL including the two optical systems 1 and 5 satisfying the Scheimpflug condition as illustrated in FIG. 2.

The object 2 is illuminated with illumination light 7. At this time, image pickup may be performed at an angle at which the illumination light 7 is regularly reflected on the object 2 (bright-field illumination). Alternatively, image pickup may be performed using dark-field illumination which is set at an angle slightly shifted from an illumination angle of illumination light 7a to prevent reflection light from directly entering the image pickup optical system PL.

Image pickup may be performed using back scattering light produced on the image pickup object plane of the object 2, such as illumination light 7b. The illumination can be suitably selected depending on which part is to be observed, of the object 2.

Figure 8A:
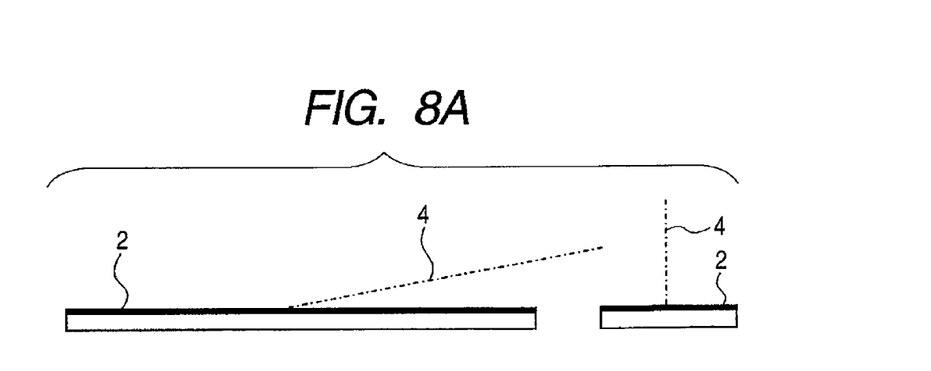
FIGS. 8A and 8B are explanatory views illustrating outer shapes of objects which can be used in the present invention.
Figure 8B:
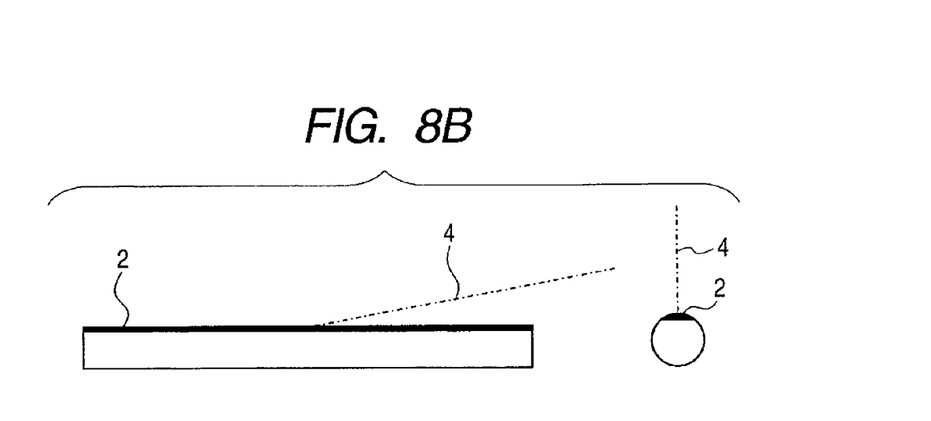

FIGS. 8A and 8B are explanatory views illustrating the shapes of objects which can be used in the respective embodiments. FIG. 8A illustrates a flat object and FIG. 8B illustrates a cylindrical object.

In each of FIGS. 8A and 8B, the left side illustrates a plane including the object 2 and the central axis 4 and the right side illustrates a shape of the object 2 in a plane orthogonal to the plane.

In the case of the cylindrical object, a surface image extending in an axis direction is obtained in a region in which the influence of curvature is small. Even in an inner portion of the cylindrical object, an image extending in the axis direction is obtained.

The above-mentioned description is based on the condition that the central light beam 4a is perpendicularly incident on the final image plane. For an actual image pickup optical system, a slightly tilted structure may be employed. In such a case, the degree of freedom of design can be improved so as to reduce the tilt angle $\theta$.

Figure 9:
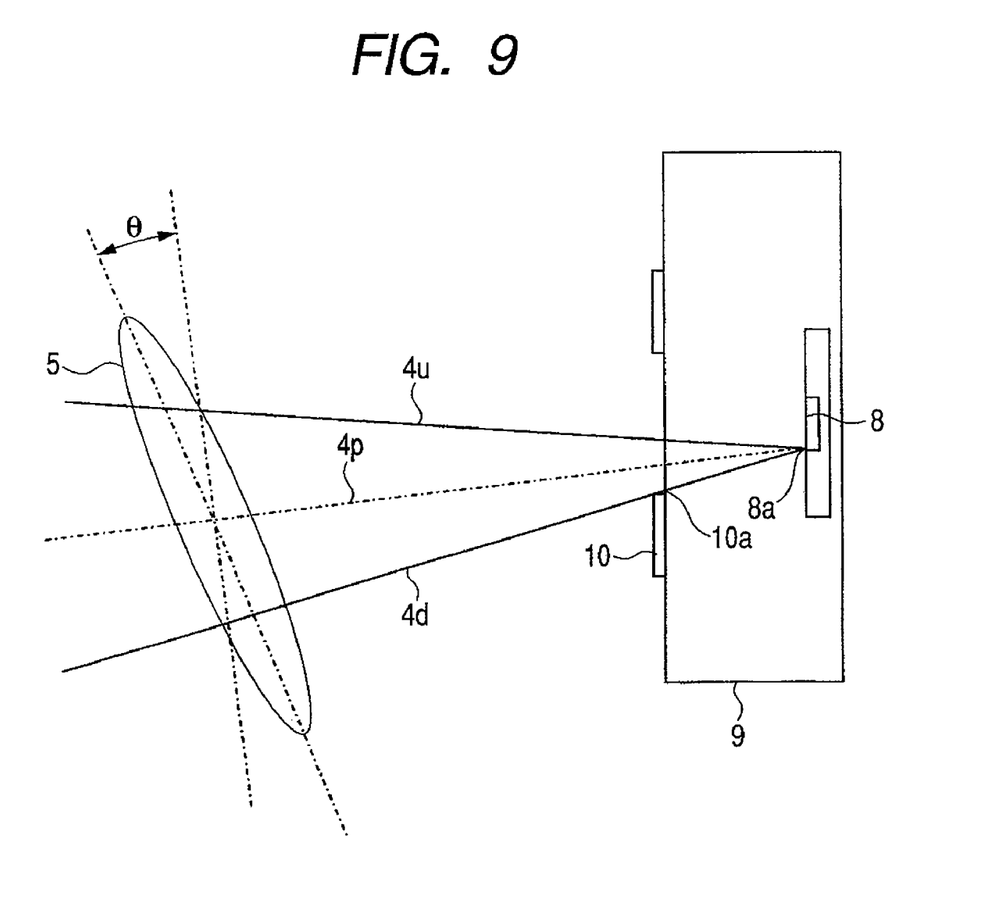
FIG. 9 is an explanatory diagram illustrating an image pickup apparatus according to an embodiment of the present invention.

FIG. 9 is a schematic diagram illustrating the case where the present invention is applied to an image pickup apparatus. In FIG. 9, only the second optical system 5 is illustrated.

As illustrated in FIG. 9, among light rays having a maximum inclination, of light beams incident on an image pickup plane 8, at least each of a principal ray 4p of light rays reaching an end 8a of the image pickup plane 8 of a camera (image pickup apparatus) 9 and light rays 4u and 4d in both ends of the light flux is prevented from being blocked by an end 10a of a lens holding portion 10 of the camera. Considering the inclination angle, it is also possible to design to make the tilt angle $\theta$ slightly smaller.

Figure 10:
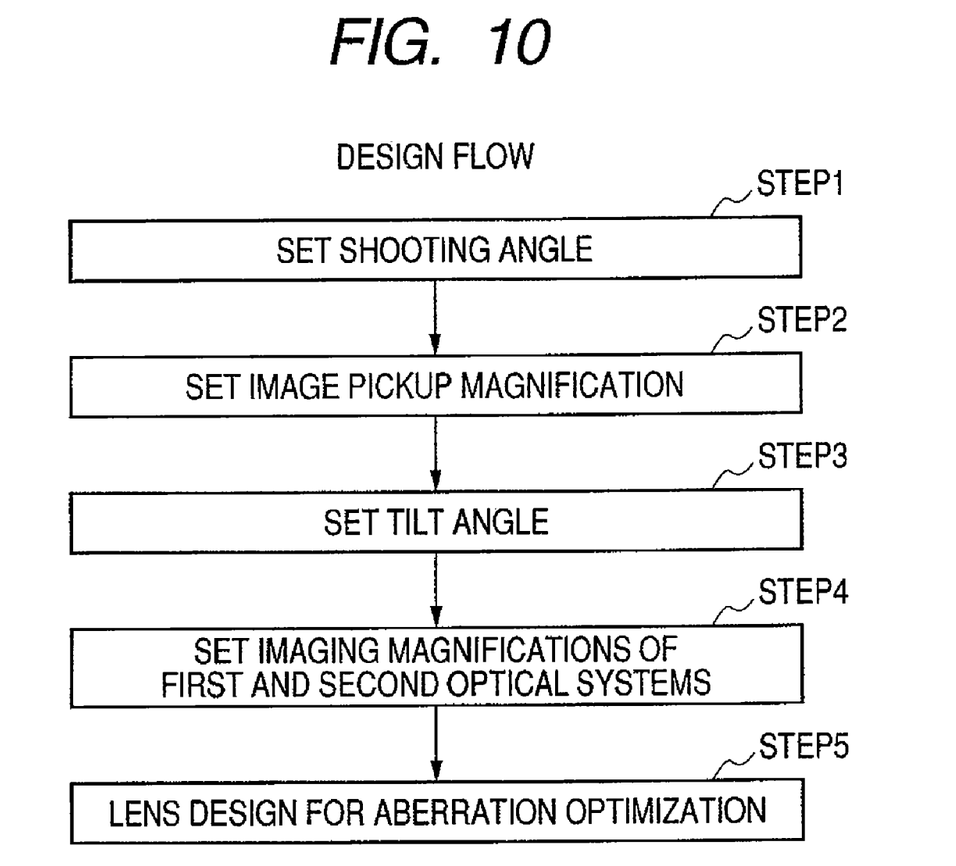
FIG. 10 is a design flowchart illustrating steps executed to design the image pickup optical system according to the present invention.

FIG. 10 illustrates an example of a design flowchart executed to design the image pickup optical system according to the present invention. In Step 1, the shooting angle $\alpha$ is determined.

In Step 2, a value of an image pickup magnification (1/P) is determined. Then, in Step 3, a maximum tilt angle $\theta$max is determined. After the values are determined, a reduction magnification (1/m) of the first optical system 1 and an enlargement magnification (n) of the second optical system 5 are determined in Step 4. Finally, in Step 5, a normal lens design for correcting aberration is executed.

The above-mentioned steps are executed for each of the embodiments.

As described above, according to each of the embodiments, the image pickup optical system includes the first optical system 1 whose principal plane 1a is tilted relative to the image pickup plane and the second optical system 5 for forming the intermediate image formed by the first optical system 1 on the image pickup plane 6.

With the configuration, it is easy to perform precise low-angle image pickup in a wide area of the object 2. In particular, even in the case of the low-angle image pickup whose shooting angle is equal to or smaller than 20°, the image pickup system need not have a significant large lens effective diameter.

In particular, the second optical system 5 can be configured such that the plane on which the intermediate image is formed by the first optical system 1, the principal plane 5a of the second optical system 5, and the image pickup plane 6 satisfy the Scheimpflug condition.

According to the structure, the shooting can be performed at a smaller shooting angle without an increase in tilt angle, so that an image of a surface state of the object can be suitably pickup up and observed.

A second intermediate image formed on the image pickup plane 6 may be formed by a single or multiple optical systems 5, each of which has the structure illustrated in FIG. 1 or 2. Therefore, the tilt angle can be further reduced, with the result that image information of the object plane of the object is obtained based on high optical performance.

When a solid-state image pickup element is provided in the image pickup plane 6 for the image pickup optical system according to each of the embodiments, it is possible to construct an examination apparatus capable of analyzing the image information obtained from the solid-state image pickup element to examine a surface state including unevenness and defect, of the object 2 at high precision.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-146437, filed on May 26, 2006, which is hereby incorporated by reference herein in its entirety.

What is claimed is:

1. An image pickup optical system, comprising:
   a first optical system configured as a coaxial system; and
   a second optical system configured as a coaxial system, for enlarging an image formed by the first optical system and forming the enlarged image,
   wherein a principal plane of the first optical system is tilted relative to an image plane of the second optical system; and
   wherein the principal plane of the first optical system and a principal plane of the second optical system are tilted in different directions relative to the image plane of the second optical system; and
   wherein a line connecting one of a front principal point and a rear principal point of the first optical system with one of a front principal point and a rear principal point of the second optical system is perpendicular to the image plane of the second optical system.

2. An image pickup optical system according to claim 1, wherein the first optical system forms a reduced image of an object.

3. An image pickup optical system according to claim 1, wherein an image plane formed by the first optical system, a principal plane of the second optical system, and an image plane formed by the second optical system satisfy a Scheimpflug condition.

4. An image pickup optical system according to claim 1, wherein in the image pickup optical system, an angle formed between an image pickup object plane and an axis perpendicular to the image plane of the second optical system is equal to or smaller than 20°.

5. An image pickup optical system according to claim 1, wherein the first optical system and the second optical system are configured to align a center of an image pickup object plane, a center of the image formed by the first optical system, and a center of the image plane of the second optical system with one another on a straight line.

6. An image pickup apparatus, comprising:
   the image pickup optical system according to claim 1; and
   a solid-state image pickup element for receiving the image formed by the image pickup optical system.

* * * * *